US012418121B2

(12) United States Patent
Ye et al.

(10) Patent No.: US 12,418,121 B2
(45) Date of Patent: Sep. 16, 2025

(54) GOLD FINGER CONNECTOR AND MEMORY STORAGE DEVICE

(71) Applicant: PHISON ELECTRONICS CORP., Miaoli (TW)

(72) Inventors: Zong-Sian Ye, Penghu County (TW); Yang-Tse Hung, Hsinchu County (TW); Jin-Jia Chang, Taoyuan (TW); Bo-Yuan Wu, New Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 327 days.

(21) Appl. No.: 18/073,546

(22) Filed: Dec. 1, 2022

(65) Prior Publication Data

US 2024/0145952 A1 May 2, 2024

(30) Foreign Application Priority Data

Nov. 1, 2022 (TW) ................................. 111141532

(51) Int. Cl.
*H01R 12/57* (2011.01)
*H01R 13/03* (2006.01)

(52) U.S. Cl.
CPC ............ *H01R 12/57* (2013.01); *H01R 13/03* (2013.01); *H01R 2201/06* (2013.01)

(58) Field of Classification Search
CPC .... H01R 12/57; H01R 13/03; H01R 2201/06; H01R 12/721; H01R 13/658
See application file for complete search history.

(56) References Cited

U.S. PATENT DOCUMENTS

| | | | | |
|---|---|---|---|---|
| 5,026,292 A * | 6/1991 | Pickles | H01R 12/721 | 439/108 |
| 7,147,512 B2 * | 12/2006 | Wu | H01R 12/53 | 439/607.05 |
| 7,307,437 B1 * | 12/2007 | Dobbs | G01R 31/2805 | 324/756.07 |
| 11,688,963 B2 * | 6/2023 | Herring | H01R 13/65915 | 439/78 |
| 2004/0106317 A1 * | 6/2004 | Koser | H01R 12/721 | 439/325 |
| 2009/0068860 A1 * | 3/2009 | Suzuki | H01R 12/88 | 439/67 |

(Continued)

FOREIGN PATENT DOCUMENTS

CN 104183986 12/2014

OTHER PUBLICATIONS

"Office Action of China Counterpart Application", issued on Jul. 16, 2025, pp. 1-6.

*Primary Examiner* — Truc T Nguyen
(74) *Attorney, Agent, or Firm* — JCIPRNET

(57) ABSTRACT

A gold finger connector and a memory storage device are disclosed. The gold finger connector includes: a connector body, a pin carrier, a plurality of first pins, a plurality of second pins, and at least one signal shielding structure. The pin carrier is protruded out of the connector body. The first pins are disposed on a first surface of the pin carrier. The second pins are disposed on the first surface and at least partially staggered with the first pins. The at least one signal shielding structure is disposed on the pin carrier and configured to conduct at least one target pin in the second pins to at least one ground layer.

16 Claims, 3 Drawing Sheets

(56) References Cited

U.S. PATENT DOCUMENTS

| | | | | |
|---|---|---|---|---|
| 2014/0349496 | A1* | 11/2014 | Zhu | H05K 1/0219 439/108 |
| 2015/0111402 | A1* | 4/2015 | Hackman | H01R 13/65914 439/98 |
| 2015/0140861 | A1* | 5/2015 | Regnier | H01R 12/71 439/607.1 |
| 2015/0200502 | A1* | 7/2015 | Nishimura | H01R 13/6463 439/607.05 |
| 2016/0365673 | A1* | 12/2016 | Liang | H01R 13/6469 |
| 2017/0062991 | A1* | 3/2017 | Lee | H05K 1/025 |
| 2019/0380204 | A1* | 12/2019 | Cartier, Jr. | H05K 1/145 |
| 2022/0359999 | A1* | 11/2022 | Steer | H05K 1/117 |
| 2024/0145952 | A1* | 5/2024 | Ye | H01R 12/57 |
| 2024/0347982 | A1* | 10/2024 | Daughtry | H01R 13/6593 |
| 2025/0183572 | A1* | 6/2025 | Wang | H01R 13/04 |

* cited by examiner

GOLD FINGER CONNECTOR AND MEMORY STORAGE DEVICE

CROSS-REFERENCE TO RELATED APPLICATION

This application claims the priority benefit of Taiwan application serial no. 111141532, filed on Nov. 1, 2022. The entirety of the above-mentioned patent application is hereby incorporated by reference herein and made a part of this specification.

BACKGROUND OF THE INVENTION

Field of the Invention

The invention relates to a connector structure, and more particularly, to a gold finger connector and a memory storage device.

Description of Related Art

Some types of memory storage devices are equipped with a gold finger connector to communicate with a host system via the pins on the gold finger connector. However, the pins on the gold finger connector are very close to each other and readily interfere with each other during signal transmission.

SUMMARY OF THE INVENTION

The invention provides a gold finger connector and a memory storage device that may suppress the electrical interference between a portion of the pins on the gold finger connector.

An embodiment of the invention provides a gold finger connector including a connector body, a pin carrier, a plurality of first pins, a plurality of second pins, and at least one signal shielding structure. The pin carrier is protruded out of the connector body. The plurality of first pins are disposed on a first surface of the pin carrier. The plurality of second pins are disposed on the first surface and at least partially staggered with the plurality of first pins. The at least one signal shielding structure is disposed on the pin carrier and configured to conduct at least one target pin in the plurality of second pins to at least one ground layer.

An exemplary embodiment of the invention further provides a memory storage device including a gold finger connector, a rewritable non-volatile memory module, and a memory control circuit unit. The memory control circuit unit is coupled to the gold finger connector and the rewritable non-volatile memory module. The gold finger connector includes: a connector body, a pin carrier, a plurality of first pins, a plurality of second pins, and at least one signal shielding structure. The pin carrier is protruded out of the connector body. The plurality of first pins are disposed on a first surface of the pin carrier. The plurality of second pins are disposed on the first surface and at least partially staggered with the plurality of first pins. The at least one signal shielding structure is disposed on the pin carrier and configured to conduct at least one target pin in the plurality of second pins to at least one ground layer.

Based on the above, the plurality of pins may be disposed on the pin carrier of the gold finger connector protruding out of the connector body. In particular, by further disposing the signal shielding structure on the pin carrier to conduct the at least one target pin in the pins and the at least one ground layer, the electrical interference between a portion of the pins on the gold finger connector may be effectively suppressed.

DESCRIPTION OF THE EMBODIMENTS

Figure 1:
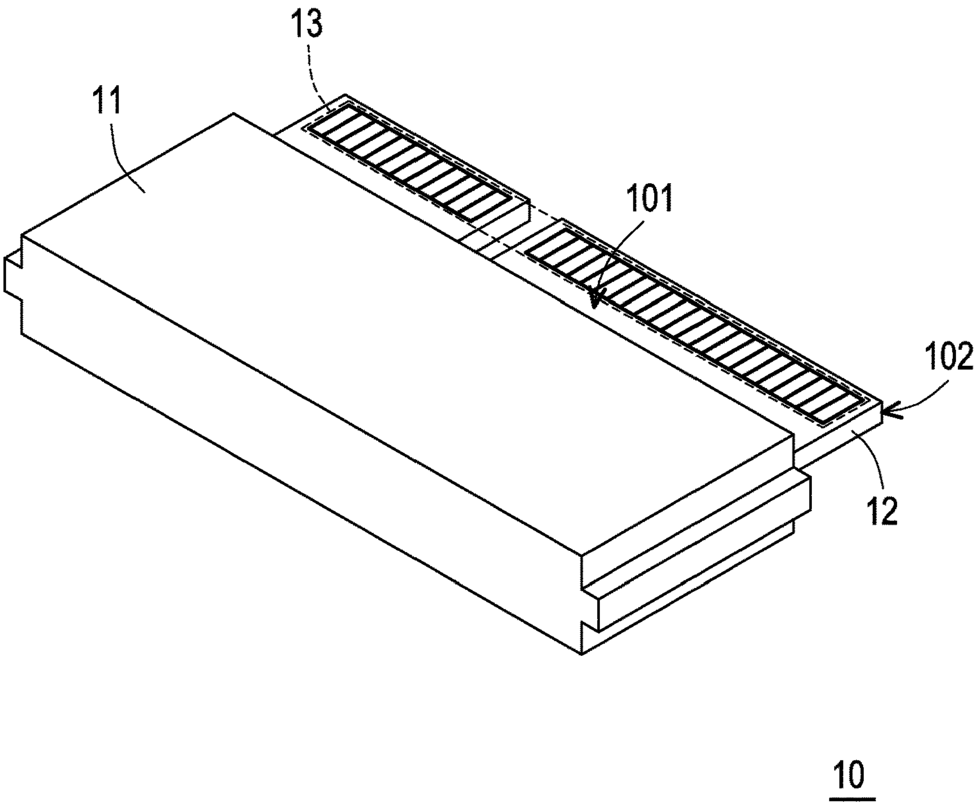
FIG. 1 is a schematic view of the appearance of a gold finger connector shown according to an exemplary embodiment of the invention.

FIG. 1 is a schematic view of the appearance of a gold finger connector shown according to an exemplary embodiment of the invention.

Referring to FIG. 1, a gold finger connector 10 includes a connector body 11, a pin carrier 12, and a pin group 13. The connector body 11 may be configured to accommodate, for example, a control chip, a circuit board, and various electronic circuits configured to perform signal processing of the gold finger connector 10.

The pin carrier 12 is protruded out of the connector body 11. Thereby, the pin carrier 12 is adapted to be inserted into a matching socket in a host system (not shown) to communicate with the host system via the socket. In addition, the shape of the pin carrier 12 may be adjusted according to practical requirements, which is not limited in the invention.

The pin group 13 is disposed on a surface (also referred to as the first surface) 101 of the pin carrier 12. The pin group 13 includes a plurality of pins. The material of the pins may be metal or any conductive material. In addition, the pins in the pin group 13 may be disposed side by side on the surface 101, as shown in FIG. 1. For example, the pins in the pin group 13 may conform to the configuration specifications of various connection interfaces such as M.2.

In an exemplary embodiment, after a surface (also referred to as the second surface) 102 of the pin carrier 12 is inserted as the leading edge into a matching socket in the host system, at least a portion of the pins in the pin group 13 may be electrically connected to at least a portion of the pins in the socket. In this state, the pins electrically connected to each other may be configured to transmit a signal between the connected host system and the connector body 11. It should be noted that the total number and configuration of the pins in the pin group 13 may be adjusted according to practical requirements, which are not limited in the invention.

Figure 2:
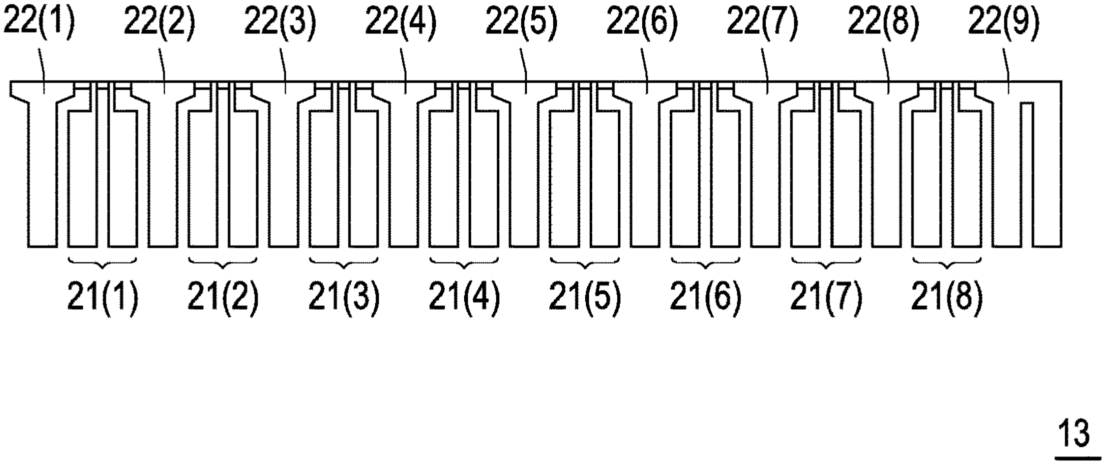
FIG. 2 is a schematic diagram of a plurality of pins in a pin group shown according to an exemplary embodiment of the invention.

FIG. 2 is a schematic diagram of a plurality of pins in a pin group shown according to an exemplary embodiment of the invention.

Referring to FIG. 1 and FIG. 2, the pin group 13 may include pins (also referred to as first pins) 21(1) to 21(8) and pins (also referred to as second pins) 22(1) to 22(9). The pins 21(1) to 21(8) and 22(1) to 22(9) are disposed on the surface 101 side by side. In particular, the pins 21(1) to 21(8) may be disposed at least partially staggered with the pins 22(1) to 22(9), as shown in FIG. 2. However, the total number and configuration of the first pins and the second pins may also be adjusted according to practical requirements, which are not limited in the invention.

In an exemplary embodiment, the pins 21(1) to 21(8) are configured to transmit a data signal. For example, the pins 21(1) to 21(8) may be electrically connected to the control chip in the connector body 11 and/or various electronic circuits configured to perform signal processing. After the pin carrier 12 is inserted into a matching socket in the host system, at least one of the pins 21(1) to 21(8) may be configured to transmit a data signal to the host system or receive a data signal from the host system. In an embodiment, the data signal may carry the bit data that the host system is to store to the memory storage device and/or the bit data that the host system reads from the memory storage device. In an exemplary embodiment, the pins 21(1) to 21(8) are also referred to as data pins.

In an exemplary embodiment, the pins 22(1) to 22(9) are configured to provide a reference ground voltage. For example, the pins 22(1) to 22(9) may be electrically connected to the connector body 11 and one or a plurality of ground layers in the circuit board inside the pin carrier 12. In an exemplary embodiment, after the pin carrier 12 is inserted into a matching socket in the host system, at least one of the pins 22(1) to 22(9) may be configured to provide the reference ground voltage to the host system or receive the reference ground voltage from the host system. In an exemplary embodiment, the pins 22(1) to 22(9) are also referred to as ground pins.

Conventionally, the pins 21(1) to 21(8) are prone to electrical interference due to the proximity of each other. This electrical interference may significantly affect the signal quality of the transmitted data signal. However, in an exemplary embodiment, by additionally disposing at least one signal shielding structure on the pin carrier 12, the electrical interference between the pins 21(1) to 21(8) may be suppressed. In particular, the signal shielding structure may be disposed on the pin carrier 12 and configured to conduct at least one pin (also referred to as a target pin) in the pins 22(1) to 22(9) and at least one ground layer below the target pin.

Figure 3:
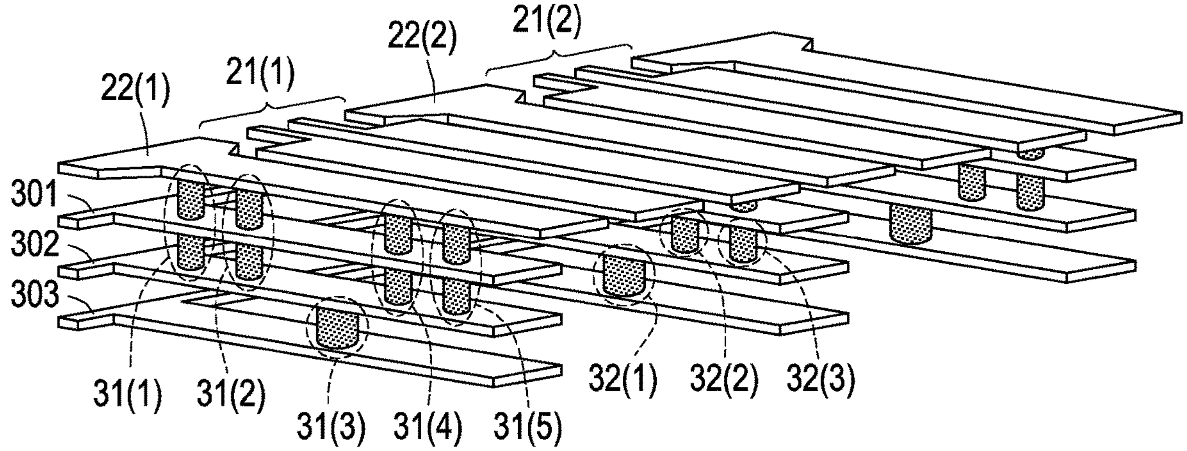
FIG. 3 is a schematic diagram of a signal shielding structure disposed on a pin carrier shown according to an exemplary embodiment of the invention.

FIG. 3 is a schematic diagram of a signal shielding structure disposed on a pin carrier shown according to an exemplary embodiment of the invention.

Referring to FIG. 3, in an exemplary embodiment, assuming that the target pin includes the pin 22(1) (also referred to as the first target pin), the signal shielding structure may be accommodated inside at least one of vias 31(1) to 31(5). For example, the signal shielding structure may be formed by plating metal inside at least one of the vias 31(1) to 31(5). The vias 31(1) to 31(5) are all disposed below the pin 22(1). For example, the vias 31(1), 31(2), 31(4), and 31(5) may penetrate the pin 22(1) and ground layers 301 and 302 below the pin 22(1). Thereby, the signal shielding structure in the vias 31(1), 31(2), 31(4), and 31(5) may conduct the pin 22(1) and the ground layers 301 and 302 below the pin 22(1). At the same time, the vias 31(1), 31(2), 31(4), and 31(5) may also penetrate the dielectric layer (not shown) between the first surface and the ground layer 301 and the dielectric layer (not shown) between the ground layers 301 and 302. Moreover, the via 31(3) may penetrate the ground layers 302 and 303 below the pin 22(1) and the dielectric layer (not shown) between the ground layers 302 and 303 to conduct the ground layers 302 and 303 below the pin 22(1).

In an embodiment, assuming that the target pin includes the pin 22(2) (also referred to as the second target pin), the signal shielding structure may be accommodated inside at least one of the vias 32(1) to 32(3). For example, the signal shielding structure may be formed by plating metal inside at least one of the vias 32(1) to 32(3). The vias 32(1) to 32(3) may all be disposed below the pin 22(2). For example, the via 32(1) may penetrate the ground layers 302 and 303 below the pin 22(2) and the dielectric layer between the ground layers 302 and 303 to conduct the ground layers 302 and 303 below the pin 22(2). Moreover, the vias 32(2) and 32(3) may penetrate the pin 22(2), the ground layers 301 and 302 below the pin 22(2), the dielectric layer between the first surface and the ground layer 301, and the dielectric layer between the ground layers 301 and 302. Thereby, the signal shielding structure in the vias 32(2) and 32(3) may conduct the pin 22(2) and the ground layers 301 and 302 below the pin 22(2).

It should be noted that the total number and configuration positions of the vias 31(1) to 31(5) and 32(1) to 32(3) in the exemplary embodiment of FIG. 3 may be adjusted according to practical needs, as long as the position of the signal shielding structure is located within the vertical projection range below the target pin. Therefore, the signal shielding structure may be configured to help suppress the electrical interference between the pins 21(1) to 21(8). Taking FIG. 3 as an example, the signal shielding structure formed via the vias 32(1) to 32(3) may be configured to suppress the electrical interference between the pins 21(1) and 21(2).

Figure 4:
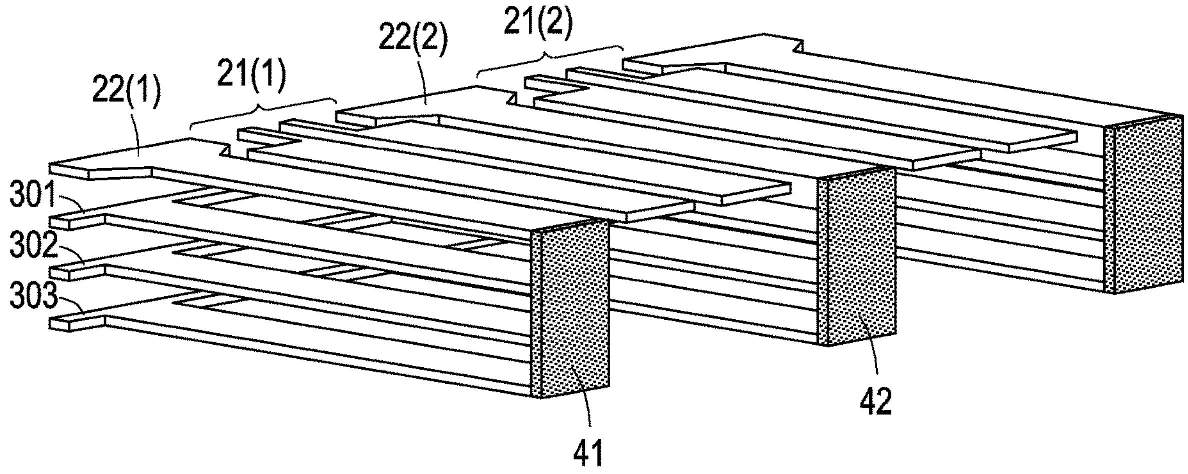
FIG. 4 is a schematic diagram of a signal shielding structure disposed on a pin carrier shown according to an exemplary embodiment of the invention.

FIG. 4 is a schematic diagram of a signal shielding structure disposed on a pin carrier shown according to an exemplary embodiment of the invention.

Referring to FIG. 1, FIG. 2, and FIG. 4, in an embodiment, if the target pin includes the pin 22(1), the signal shielding structure may include a metal layer 41. The metal layer 41 covers the surface 102 (i.e., the second surface) of the pin carrier 12. For example, the metal layer 41 may be disposed on the surface 102 of the pin carrier 12 by means of electroplating. In this way, the metal layer 41 may be configured to conduct the pin 22(1) and at least one of the ground layers 301 to 303 below the pin 22(1). Furthermore, if the target pin includes the pin 22(2), the signal shielding structure may include a metal layer 42. The metal layer 42 also covers the surface 102 of the pin carrier 12. In this way, the metal layer 42 may be configured to conduct the pin 22(2) and at least one of the ground layers 301 to 303 below the pin 22(2).

It should be noted that, in the exemplary embodiment of FIG. 4, the metal layer 41 (or 42) may provide the same or similar shielding effect of the signal shielding structure formed via the vias 31(1) to 31(5) (or the vias 32(1) to 32(3)) in the exemplary embodiment of FIG. 3 on the signal to help suppress electrical interference between the plurality of data pins. In addition, the target pin may also include other pins in the pins 22(1) to 22(9), which are not limited in the invention.

In an exemplary embodiment, the signal shielding structure is disposed below the target pin, which may be regarded as being located in the vertical projection range below the target pin. The vertical projection range is also referred to as the projection range in the direction of the normal vector. Taking FIG. 3 and FIG. 4 as examples, the vias 31(1) to 31(5) and the metal layer 41 may be regarded as being located in the vertical projection range below the pin 22(1).

In an exemplary embodiment, the configuration region of the signal shielding structure may not occupy the vertical projection range below the first pin. Such restrictions may be applied to the vias 31(1) to 31(5) and 32(1) to 32(3) of FIG. 3 and the metal layers 41 and 42 of FIG. 4. In this way, the original performance of the gold finger connector 10 may be prevented from being accidentally affected by the additionally disposed signal shielding structure.

In an exemplary embodiment, the gold finger connector 10 of FIG. 1 may be incorporated into a memory storage device. The memory storage device may be communicated with the host system via the gold finger connector 10. For example, via the gold finger connector 10, the host system may write data to the memory storage device or read data from the memory storage device.

Figure 5:
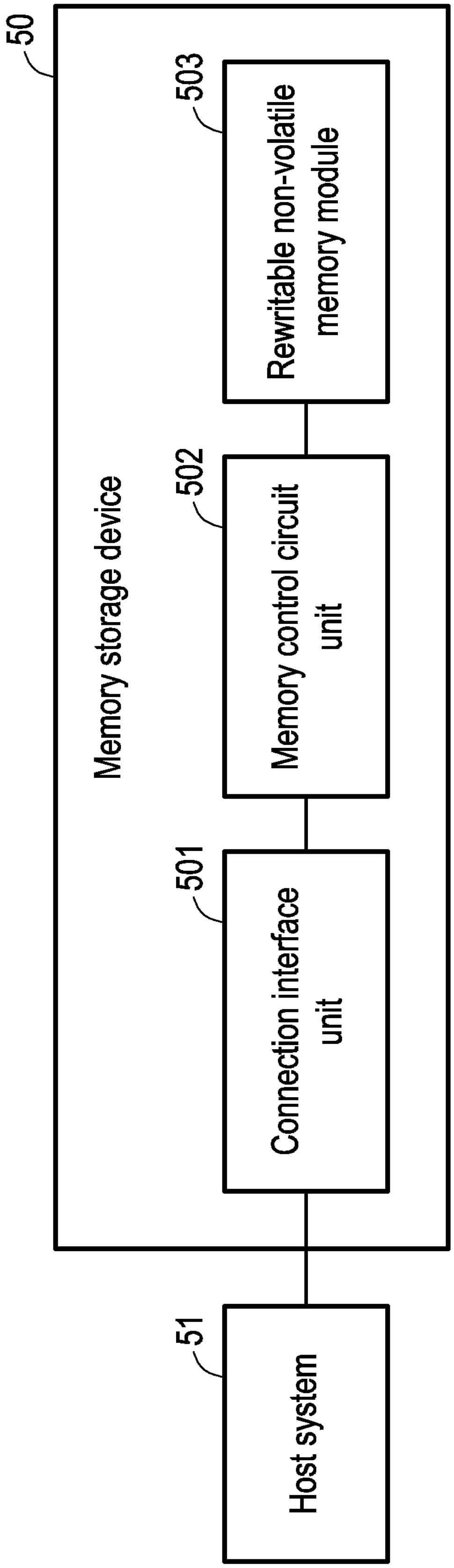
FIG. 5 is a schematic diagram of a memory storage device and a host system shown according to an exemplary embodiment of the invention.

FIG. 5 is a schematic diagram of a memory storage device and a host system shown according to an exemplary embodiment of the invention.

Referring to FIG. 5, a memory storage device 50 includes a connection interface unit 501, a memory control circuit unit 502, and a rewritable non-volatile memory module 503.

The connection interface unit 501 is configured to couple the memory storage device 50 to a host system 51. For example, the connection interface unit 501 may include the gold finger connector 10 of FIG. 1. The memory storage device 50 may be communicated with the host system 51 via the connection interface unit 501. For example, the connection interface unit 501 may be compatible with the Peripheral Component Interconnect Express (PCI Express) standard, Serial Advanced Technology Attachment (SATA) standard, Parallel Advanced Technology Attachment (PATA) standard, Institute of Electrical and Electronic Engineers (IEEE) 1394 standard, Universal Serial Bus (USB) standard, SD interface standard, Ultra High Speed-I (UHS-I) interface standard, Ultra High Speed-II (UHS-II) interface standard, Memory Stick (MS) interface standard, MCP interface standard, MMC interface standard, eMMC interface standard, Universal Flash Storage (UFS) interface standard, eMCP interface standard, CF interface standard, Integrated Device Electronics (IDE) standard, or other suitable data transmission standards.

The memory control circuit unit 502 is coupled to the connection interface unit 501 and the rewritable non-volatile memory module 503. The memory control circuit unit 502 is configured to execute a plurality of logic gates or control commands implemented in a hardware form or in a firmware form. The memory control circuit unit 502 also performs operations such as writing, reading, and erasing data in the rewritable non-volatile memory storage module 503 according to the commands of the host system 51. In an exemplary embodiment, the memory control circuit unit 502 may include a flash memory controller.

The rewritable non-volatile memory module 503 is configured to store the data written by the host system 51. For example, the rewritable non-volatile memory module 503 may include a single-level cell (SLC) NAND-type flash memory module (that is, a flash memory module that may store 1 bit in one memory cell), a multi-level cell (MLC) NAND-type flash memory module (that is, a flash memory module that may store 2 bits in one memory cell), a triple-level cell (TLC) NAND-type flash memory module (i.e., a flash memory module that may store 3 bits in one memory cell), a quad-level cell (QLC) NAND-type flash memory module (that is, a flash memory module that may store 4 bits in one memory cell), other flash memory modules, or other memory modules having the same or similar characteristics.

Based on the above, by disposing the signal shielding structure on the pin carrier of the gold finger connector to conduct specific pins and the at least one ground layer, electrical interference between a portion of the pins on the pin carrier may be effectively suppressed.

Although the disclosure has been disclosed by the above embodiments, they are not intended to limit the disclosure. It is apparent to one of ordinary skill in the art that modifications and variations to the disclosure may be made without departing from the spirit and scope of the disclosure. Accordingly, the protection scope of the disclosure will be defined by the appended claims.

What is claimed is:

1. A gold finger connector, comprising:
a connector body;
a pin carrier protruded out of the connector body;
a plurality of first pins disposed on a first surface of the pin carrier;
a plurality of second pins disposed on the first surface and at least partially staggered with the plurality of first pins; and
at least one signal shielding structure disposed on the pin carrier and configured to conduct at least one target pin in the plurality of second pins to only a part of a plurality of ground layers.

2. The golden finger connector of claim 1, wherein the plurality of first pins are configured to transmit a data signal.

3. The golden finger connector of claim 1, wherein the plurality of second pins are configured to transmit a reference ground voltage.

4. The gold finger connector of claim 1, wherein the at least one signal shielding structure is disposed below the at least one target pin.

5. The gold finger connector of claim 4, further comprising:
at least one via penetrating the at least one target pin and the part of the plurality of ground layers below the at least one target pin and configured to accommodate the at least one signal shielding structure.

6. The gold finger connector of claim 5, wherein the plurality of first vias in the at least one via penetrate a first target pin in the at least one target pin.

7. The gold finger connector of claim 1, wherein the at least one signal shielding structure comprises at least one metal layer covering a second surface of the pin carrier.

8. The gold finger connector of claim 1, wherein the at least one signal shielding structure does not occupy a vertical projection range below the plurality of first pins.

9. A memory storage device, comprising:
a gold finger connector;
a rewritable non-volatile memory module; and
a memory control circuit unit coupled to the gold finger connector and the rewritable non-volatile memory module,
wherein the gold finger connector comprises:
a connector body;
a pin carrier protruded out of the connector body;
a plurality of first pins disposed on a first surface of the pin carrier;
a plurality of second pins disposed on the first surface and at least partially staggered with the plurality of first pins; and
at least one signal shielding structure disposed on the pin carrier and configured to conduct at least one target pin in the plurality of second pins to only a part of a plurality of ground layers.

10. The memory storage device of claim 9, wherein the plurality of first pins are configured to transmit a data signal.

11. The memory storage device of claim 9, wherein the plurality of second pins are configured to transmit a reference ground voltage.

12. The memory storage device of claim 9, wherein the at least one signal shielding structure is disposed below the at least one target pin.

13. The memory storage device of claim 12, wherein the gold finger connector further comprises:

at least one via penetrating the at least one target pin and the part of the plurality of ground layers below the at least one target pin and configured to accommodate the at least one signal shielding structure.

14. The memory storage device of claim 13, wherein the plurality of first vias in the at least one via penetrate a first target pin in the at least one target pin.

15. The memory storage device of claim 9, wherein the at least one signal shielding structure comprises at least one metal layer covering a second surface of the pin carrier.

16. The memory storage device of claim 9, wherein the at least one signal shielding structure does not occupy a vertical projection range below the plurality of first pins.

* * * * *